United States Patent [19]

Yamamura

[11] 4,410,921
[45] Oct. 18, 1983

[54] APPARATUS FOR REPRODUCING INFORMATION SIGNALS FROM A DISC-SHAPED RECORDING MEDIUM AND INCLUDING A MECHANISM FOR PUSHING BACK A CASE FOR ACCOMMODATING THE RECORDING MEDIUM THEREIN

[75] Inventor: Takashi Yamamura, Yokohama, Japan

[73] Assignee: Victor Company of Japan, Ltd., Yokohama, Japan

[21] Appl. No.: 256,020

[22] Filed: Apr. 21, 1981

[30] Foreign Application Priority Data

Apr. 21, 1980 [JP] Japan .................................. 55-52765

[51] Int. Cl.³ .............................................. G11B 25/04
[52] U.S. Cl. ..................................... 360/97; 206/444; 360/133
[58] Field of Search ..................................... 360/97–99, 360/86, 133; 358/128; 206/444

[56] References Cited

U.S. PATENT DOCUMENTS

| | | | |
|---|---|---|---|
| 3,899,181 | 8/1975 | Dannert et al. | 360/133 X |
| 3,951,264 | 4/1976 | Heidecker et al. | 360/99 X |
| 4,063,286 | 12/1977 | Takahara et al. | 360/86 X |
| 4,113,262 | 9/1978 | De Stephanis | 360/97 X |
| 4,124,866 | 11/1978 | Coleman | 360/133 X |
| 4,164,782 | 8/1979 | Stewart | 360/133 |
| 4,239,238 | 12/1980 | Coleman | 360/99 X |

FOREIGN PATENT DOCUMENTS 52-71114  6/1977  Japan ...................................... 360/97

Primary Examiner—John H. Wolff
Attorney, Agent, or Firm—Louis Bernat

[57] ABSTRACT

Information signals are reproduced from a disc-shaped recording medium which was accommodated within a case. The case has a jacket with space for accommodating the disc-shaped recording medium therein and an opening through which the disc-shaped recording medium can enter and leave the jacket. A lid member may be inserted through the opening of the jacket for covering and closing the opening. The apparatus for reproducing the disc comprises an inserting opening through which the case is manually inserted. A holding mechanism holds either the disc-shaped recording medium or the lid member at an innermost part of the reproducing apparatus and on the side opposite of the inserting opening. A turntable is located between the inserting opening and the holding mechanism. A push-back mechanism includes energy storing members which are urged responsive to a disc insertion operation in which the case is inserted through the inserting opening and into the innermost part of the reproducing apparatus. The case is pushed back responsive to a release of the pushing and inserting force acting on the case. The push back occurs in response to a use of the stored energy forces. The case is pushed back in a direction which is opposite to the direction of the insertion of the case, so that after push back a part of the case projects outwardly from the inserting opening.

3 Claims, 5 Drawing Figures

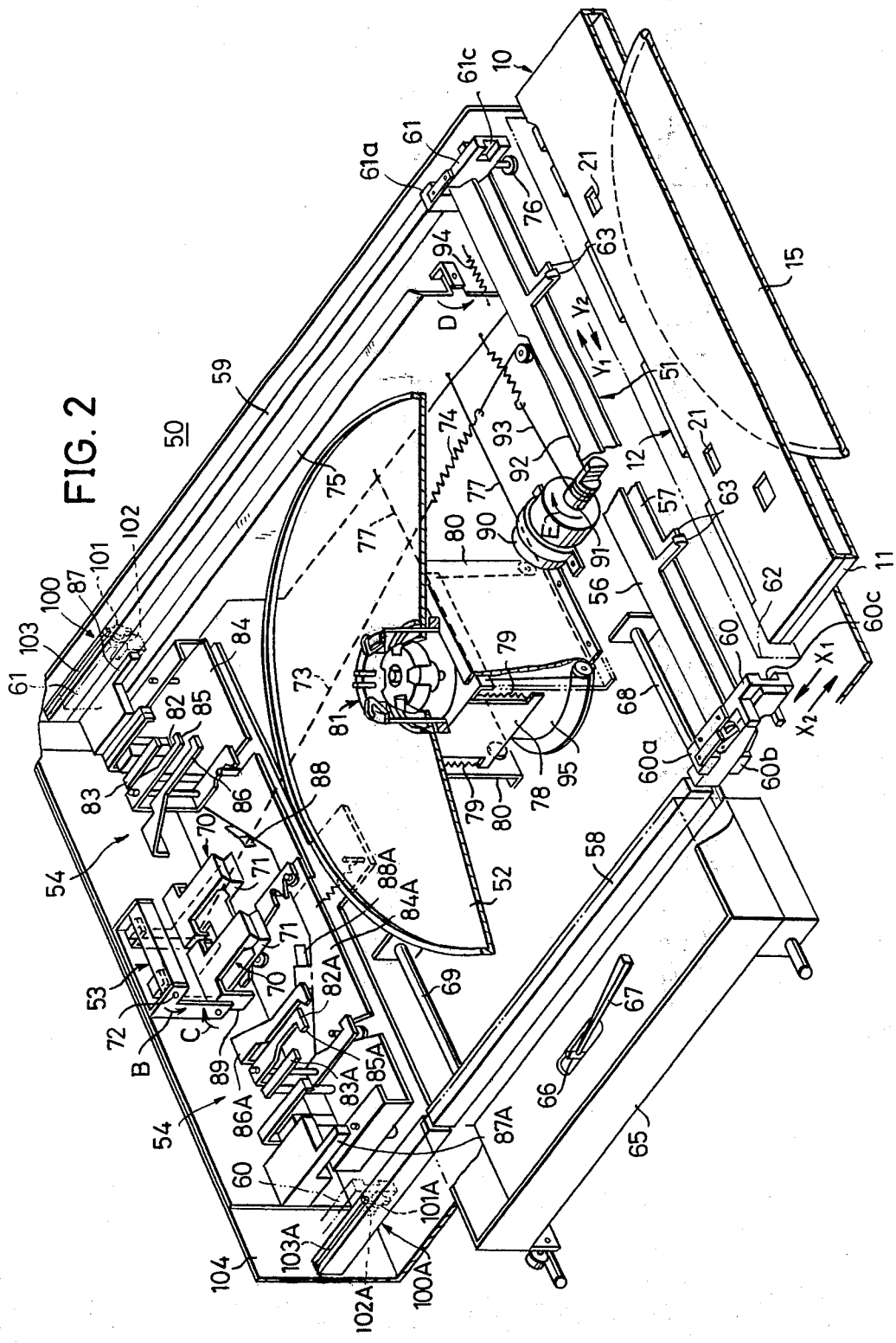

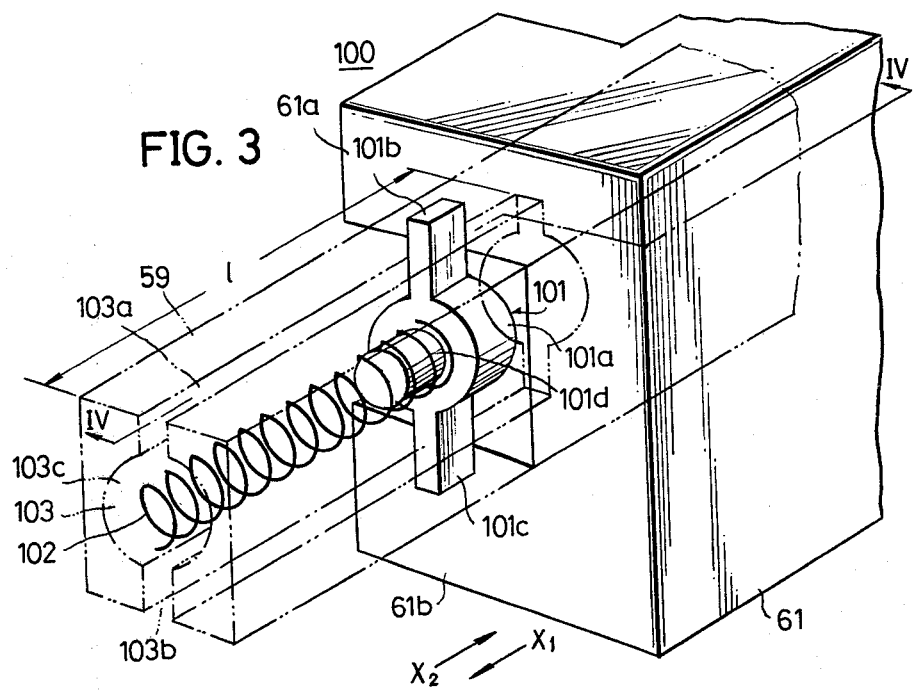
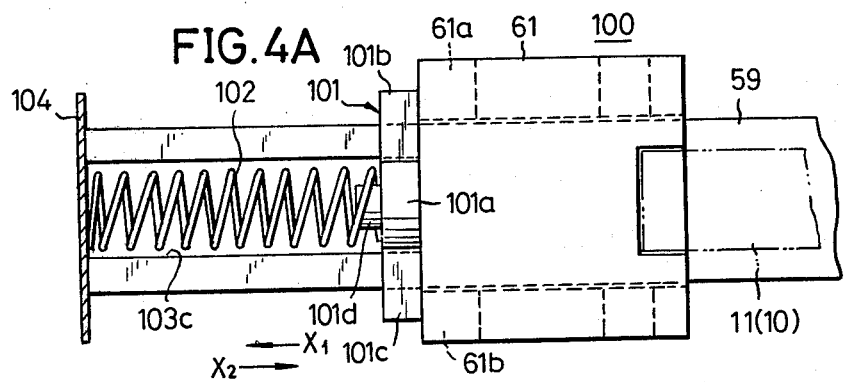
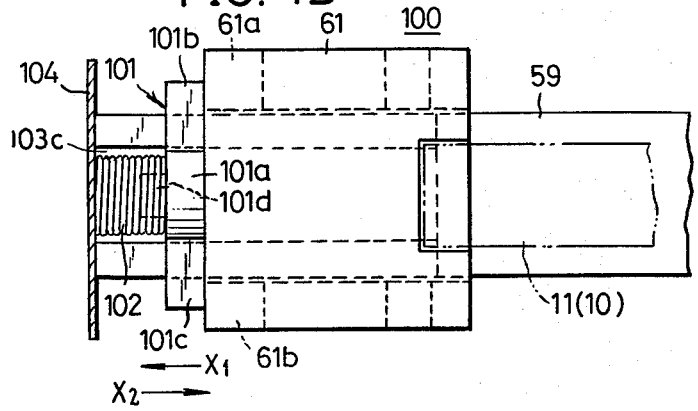

APPARATUS FOR REPRODUCING INFORMATION SIGNALS FROM A DISC-SHAPED RECORDING MEDIUM AND INCLUDING A MECHANISM FOR PUSHING BACK A CASE FOR ACCOMMODATING THE RECORDING MEDIUM THEREIN

BACKGROUND OF THE INVENTION

The present invention generally relates to disc-shaped recording medium reproducing apparatuses, and more particularly to a disc-shaped recording medium reproducing apparatus capable of placing and leaving a disc-shaped information recording medium in a state possible for reproduction within the reproducing apparatus when a case having a lid for accommodating the recording medium therein is inserted into and then pulled out from within the reproducing apparatus, and also capable of incasing the recording medium within the case so that the recording medium can be obtained outside the reproducing apparatus together with the case, when the empty case is inserted into and then pulled out from within the reproducing apparatus. The present invention further and especially relates to the above reproducing apparatus in which a disc case ejecting mechanism is provided, for pushing back the case by a predetermined amount, when the case is inserted into and pulled out from the reproducing apparatus.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc case which has a lid and accommodates a disc therein, from within the reproducing apparatus. As a conventional apparatus of this type, there is an apparatus which cooperates with a disc case comprising a rigid jacket for accommodating a disc, and a tray having a front part which is engaged by engaging means upon complete insertion of the disc case within the reproducing apparatus and an annular or ring portion fixed to the front part for encircling the outer periphery of the disc. This conventional reproducing apparatus is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

Accordingly, in United States patent application entitled "DISC-SHAPED RECORDING MEDIUM REPRODUCING APPARATUS" in which the assignee is the same as that of the present application, a reproducing apparatus was proposed which cooperates with a disc case having a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

On the other hand, a reproducing apparatus has been proposed, which comprises a mechanism for partially pushing back a case which is being inserted into the reproducing apparatus. In this proposed reproducing apparatus, the following disadvantages are introduced, since a force acts on the lid of the case in order to push back the case.

(I) Since the lid is locked within the reproducing apparatus upon loading of the disc, the push-back operation to push back the case is only performed upon recording of the disc, and is not performed upon loading of the disc. Accordingly, there is a limit in reducing the size of the case, because a gripping portion which projects from the reproducing apparatus when the case is inserted into the final position within the reproducing apparatus, is required.

(II) Since the push-back force which pushes back the case acts on the lid, and the lid must be supported within the reproducing apparatus upon reproduction, the lid must be held with a force so as to sufficiently withstand the above push-back force. Accordingly, the holding mechanism for holding the lid and the disc must be powerful. Furthermore, the disc loading operation becomes uneasy, since a large force is required to perform the operation in which the case is inserted within the reproducing apparatus and the holding mechanism is forcibly opened.

SUMMARY OF THE INVENTION

Accordingly, a general object of the present invention is to provide a novel and useful disc-shaped recording medium reproducing apparatus in which the above described problems have been eliminated.

Another and more specific object of the present invention is to provide a disc-shaped recording medium reproducing apparatus which has means for operating on a jacket which is being inserted within the reproducing apparatus, to partially push back the jacket outside the reproducing apparatus.

Further objects and features of the present invention will be apparent from the following detailed description when read in conjunction with the accompanying drawings.

BRIEF DESCRIPTION OF THE DRAWINGS

FIG. 2 is a perspective view showing the inner construction of a disc reproducing apparatus according to the present invention, with a part cut away;

FIG. 3 is a perspective view showing an embodiment of a disc case ejecting mechanism which forms an essential part of the reproducing apparatus according to the present invention; and FIGS. 4A and 4B are cross-sectional diagrams along the line IV—IV in FIG. 3, respectively showing the disc ejecting mechanism shown in FIG. 3 at different operating states.

DETAILED DESCRIPTION

Figure 1:
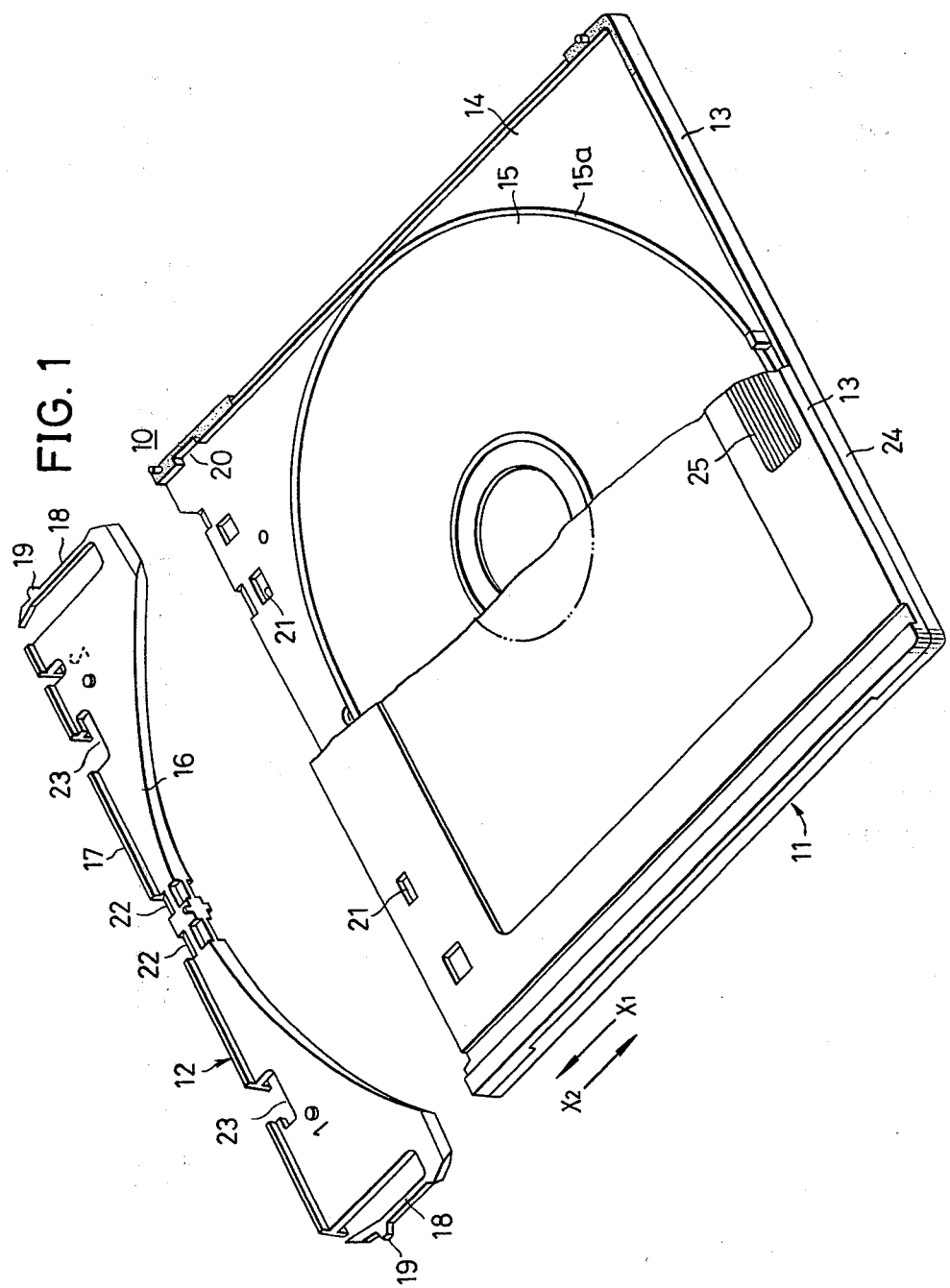
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid palte 12 is inserted into a predetermined position within the jacket 11. Moreover, a projection 19 of the engaging arm 18 engages into a depression 20, and thus, the lid plate 12 engages with the jacket 11.

The size of the jacket 11 is approximately equal to the diameter of the disc 15 in the width direction indicated by the arrow Y and in the inserting direction indicated by the arrow X, and accordingly substantially has a square shape. In addition, the jacket 11 occupies the left and right hand side ends of the lid plate 12, in the disc case 10. Therefore, as will be described hereinafter, the parts which engage with supporting members (sliders) 60 and 61 upon insertion of the disc case, are portions of the jacket 11.

As shown in FIG. 2, a reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid palte 12, and the like.

The jacket opening enlarging mechanism 51 comprises upper and lower beams 56 and 57 extending in the directions of the arrows Y1 and Y2, and the supporting members 60 and 61 (sliders) which are respectively fixedly inserted into the guide rails 58 and 59, to support both ends of the respective beams 56 and 57. The jacket opening enlarging mechanism 51 is guided by guide rails 58 and 59, and moves between the innermost part of the reproducing apparatus 50 and a disc case inserting opening 62 provided at the frame of the reproducing apparatus 50, in the directions of the arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on be left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of arrow B due to the force of a spring 74. Accordingly, the holding finger 71 receives a force uging rotation in the upward direction. The upper holding finger 70 is axially supported by a pin.

Upon reproduction of the disc 15, the disc case 10 is inserted through the inserting opening 62 of the reproducing apparatus 50, by manually inserting the disc case 10 with the side of the lid plate 12 into the direction of the arrow X1. When the jacket opening enlarging mechanism 51 is pushed and moved in the direction of the arrow X1 by the disc case 10. When the enlarging mechanism 51 moves, the upper and lower beams 56 and 57 rotate, and the enlarging fingers 63 thus respectively move in a direction to mutually separate from each other. Accordingly, the tip ends of the enlarging fingers 63 engage with the engaging windows 21 of the jacket 11, and enlarge the front part of the upper and lower jacket halves 13 upwards and downwards, to enlarge the opening.

A sloping surface of a rotary plate 75 is pushed by a roller 76 provided on the slider 61, and the rotary plate 75 rotates in the direction of the arrow D, due to the movement of the jacket opening enlarging mechanism 51. Accompanied by the rotation of the rotary plate 75, a wire 77 is pulled, and a push-up plate 78 is accordingly pulled downwards. Four corners of the push-up plate 78 are suspended and supported by springs 79 with respect to a support plate 80. Due to the downward movement of the push-up plate 78, a disc clamping mechanism 81 moves downwards, to retreat from the insertion passage of the disc case 10.

When the disc case 10 is inserted into the innermost part of the reproducing apparatus 50 together with the enlarging mechanism 51 through the upper side of the turntable 52, ride-over parts 22 of the lid plate 12 enter between the holding parts which are positioned mutually opposite to the holding fingers 70 and 71, and pass through these holding parts by pushing and spreading these parts. The holding fingers 70 and 71 close, as will be described hereinafter, after the ride-over parts 32 of the lid plate 12 have passed through, and the holding parts accordingly clamp a groove guard 15a of the disc 15.

Accompanied by the insertion of the disc case 10, locking fingers 82 and 82A relatively enter inside L-shaped cutouts 23 of the lid plate 12, and the rim portion 17 accordingly pushes contact fingers 83 and 83A. When the contact fingers 83 and 83A are pushed by the lid plate 12, main levers 84 and 84A respectively rotate to be latched. Furthermore, the locking fingers 82 and 82A rotate in directions so as to mutually separate from each other, and L-shaped parts 85 and 85A provided at the tip ends of the above locking fingers 82 and 82A respectively enter into the innermost parts of the cutouts 23, to lock the lid plate 12. The lid palte 12 is limited of its movement in the direction of the arrow X1 by the contact fingers 83 and 83A, and the lid plate 12 is thus locked and supported at the innermost part of the reproducing apparatus 50 in a state in which the lid plate 12 is placed and supported on supporting fingers 86 and 86A.

Furthermore, engagement releasing members 87 and 87A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 84 and 84A rotate to positions where they are latched, the leaf springs 88 and 88A respectively provided at the bent parts of the main levers push against a vertically extending part 89 of the upper holding finger 70. Hence, a rotational force in the direction of the arrow C is applied to the holding finger 70. Thus, the disc 15 is held at a predetermined height by the lower holding finger 71 and the upper holding finger 70.

Accordingly, when the disc case 10 is inserted into the final position, the engagement of the lid plate 12 with respect to the jacket 11 is released, and the disc 15 thus becomes locked by the locking fingers 82 and 82A, and held by the holding fingers 70 and 71.

Next, the jacket 11 is manually pulled out in the direction of the arrow X2. Since the lid palte 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11.

Accompanied by the movement of the jacket 11 in the direction of the arrow X2, the jacket opening enlarging mechanism 51 also moves together with the jacket in the direction of the arrow X2.

When the jacket 11 is pulled out to the vicinity of the inserting opening 62, the rotary plate 75 rotationally returns and the disc clamping mechanism 81 moves up to support the center part of the disc 15. Furthermore, when the jacket 11 is pulled out, the disc 15 completely separates from the jacket 11, the jacket opening enlarging mechanism 51 returns to its original position, and the jacket opening enlarging figners 63 rotate in directions so as to mutually close upon each other and separate from the engaging windows 21. The jacket 11 returns to its original state due to its flexibility, and the enlarged opening also returns to the original state, and the jacket 11 is completely pulled out from the reproducing apparatus 50. In this state, the disc 15 is supported horizontally at a position above the turntable 52, by the holding fingers 70 and 71 and the disc clamping mechanism 81.

When a play button (not shown) is then pushed, a motor 90 begins to rotate, and a take-up shaft 91 rotates in the direction of arrow E, and hence wires 92 and 93 are thus pulled out from the take-up shaft 91. Accordingly, the holding finger 71 rotates in a direction opposite to the direction of the arrow B, to release the clamping with respect to the disc 15. Further, the rotary plate 75 is rotated in the direction of the arrow D by a tension spring 94, to move the disc clamping mechanism 81 downwards. Hence, the disc 15 moves down and is placed on the turntable 52, and held by the disc holding mechanism 53 which will be described hereinafter. The pickup frame 65 moves in the direction of the arrow Y1 from the waiting position, and the turntable 52 is rotated by a motor 95. Thus, the disc 15 is relatively scanned by the reproducing stylus 66, to reproduce the information signal.

Next, an operation in which the disc 15 is recovered from within the reproducing apparatus 50, will now be described.

Upon completion of the reproducing operation, the motor 90 rotates in a direction opposite to the direction as the above after the motor 95 and the turntable 52 stop rotating, and the take-up shaft 91 takes up the wires 92 and 93. Accordingly, the rotary plate 75 rotates in a direction so as to loosen the wire 77, and the disc clamping mechanism 81 thus moves up to push the disc 15 up. Furthermore, the holding finger 71 rotates in the direction of the arrow B, to hold the disc 15.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 50 to be recovered within the disc case 10.

Next, an embodiment of a disc case ejecting mechanism which forms an essential part of the reproducing apparatus according to the present invention, will be described in conjunction with FIGS. 3, 4A, and 4B. In FIGS. 3, 4A, and 4B, those parts which are the same as those corresponding parts in FIG. 2 are designated by the like reference numerals, and their description will be omitted.

Disc case ejecting mechanisms 100 and 100A are respectively assembled at the innermost portions of the right and left hadn side guide rails 59 and 58. The disc case ejecting mechanisms 100 and 100A are respectively constructed similarly, and in the following, description will be given with respect to the disc case ejecting mechanism 100 provided on the right hand side. Parts of the disc case ejecting mechanism 100A which correspond to the parts of the disc case ejecting mechanism 100 will be designated by like reference numerals, with a subscript "A."

The disc case ejecting mechanism 100 comprises a push-back member 101 and a coil spring 102 which are respectively assembled within a cutout groove 103 provided at the innermost part of the guide rail 59. The cutout groove 103 comprises upper and lower groove portions 103a and 103b, and a central columnar space portion 103c, and is formed extending for a predetermined length l. The guide rail 59 is mounted so that the innermost part end of the guide rail 59 makes contact with a rear wall 104 of the reproducing apparatus 50.

The push-back member 101 comprises a columnar main body 101a which is inserted into the columnar space portion 103c, and arm portions 101b and 101c which respectively are inserted into the upper and lower groove portions 103a and 103b, and the push-back member 101 can move in the directions of the arrows X1 and X2 along the cutout groove 103. The arm portions 101b and 101c respectively project from the upper and lower surfaces of the guide rail 59 by a predetermined amount, and makes contact with upper and lower arm portions 61a and 61b of the slider 61, as will be described hereinafter.

The push-back coil spring 102 is assembled within the columnar space portion 103c. One end of the push-back coil spring 102 makes contact with the rear wall 104, and the other end of the coil spring 102 is inserted with a projection 101d of the push-back member 101 to make contact with the columnar main body 101a. This coil spring 102 is compressed upon insertion of the case into the reproducing apparatus, and urges the push-back member 101 in the direction of the arrow X2.

The disc case ejecting mechanism 100A also comprises a push-back member 101A and a push-back coil spring 102A which are respectively assembled within a cutout groove 103A provided at the innermost part of the guide rail 58.

Before loading of the disc 15, each of the disc case ejecting mechanisms 100 and 100A are in a state shown in FIG. 2, and the push-back members 101 and 101A are pushed back to the ends of the cutout grooves 103 and 103A in the direction of the arrow X2, by the coil springs 102 and 102A.

Next, description will be given on the operation of the above described disc case ejecting mechanism, with respect to the loading and unloading of the disc.

Upon loading of the disc, both ends of the jacket 11 are fitted into inner depressions 61c and 60c of the sliders 61 and 60, and thus, the disc case 10 is pushed in and inserted into the reproducing apparatus in the direction of the arrow X1. The upper and lower arm portions 61a and 61b, and 60a and 61b, respectively make contact with the upper and lower surfaces of the guide rails 59 and 58, and the sliders 61 and 60 are respectively freely slidable with respect to the guide rails 59 and 58. Due to the insertion of the disc case 10 into the reproducing apparatus 50, the sliders 61 and 60 respectively move along the guide rails 59 and 58 in the direction of the arrow X1, into positions shown by two-dot chain lines in FIG. 2 (the position of the slider 61 is shown in FIG. 4B). Upon final movement of the slider 61, the arm portions 61a and 61b respectively engage with arm portions 101b and 101c of the push-back member 101 as shown in FIG. 4A, and push the push-back member 101. The push-back member 101 moves to a position shown in FIG. 4B by being pushed by the slider 61 in the direction of the arrow X1, to compress the coil spring 102. Furthermore, upon final movement of the slider 60, the push-back member 101A is similarly pushed in the direction of the arrow X1 and moves, to compress the coil spring 102A.

In a state where the disc case 10 is pushed in and inserted into the above described final position within the reproducing apparatus, the lid plate 12 is locked by the lid plate locking mechanism 54, and the disc 15 is held by the disc holding mechanism 53. The disc case 10 has a dimension in which the length of the case in the inserting direction of the disc case is short compared to the width of the disc case. Therefore, upon insertion of the disc case 10 into the final position within the reproducing apparatus, a back end surface 24 which faces towards a direction opposite to the inserting direction of the disc case 10, is pushed by the operator. Accordingly, even a gripping portion 25 of the disc case 10 passes through the inserting opening 62, and enters within the reproducing apparatus 50. Hence, in this state, there is no part of the disc case 10 which can be gripped in order to pull out the disc case 10 from within the reproducing apparatus.

In this final inserted state described above, the disc case ejecting mechanism 100 is in a state shown in FIG. 4B. The arm portions 61a and 61b of the slider 61, are respectively engaged by the arm portions 101b and 101c of the push-back member 101, and the slider 61 accordingly receives a push-back force which urges the slider 61 to move in the direction of the arrow X2 due to a force exerted by the coil spring 102 in the compressed state. Moreover, the slider 60 also receives a push-back force which urges the slider 60 to move in the direction of the arrow X2 due to a force exerted by the coil spring 102A transmitted through the push-back member 101A. Thus, when the force which urges the disc case 10 to move in the direction of the arrow X1 is released, the sliders 61 and 60 are respectively pushed back. The push-back operation to respectively push the sliders 61 and 60, is performed until the push-back members 101 and 101A respectively reach the final positions of the cutout grooves 103 and 103A, as shown in FIG. 4A. Hence, as a result of this push-back operation to push the sliders 61 and 60 back, only the jacket 11 is pushed back by a predetermined amount, and the gripping portion 25 projects from the inserting opening 62.

Then, the operator holds the gripping portion 25 of the disc case 10 which projects from the inserting opening 62, and pulls the jacket 11 in the direction of the arrow X2.

Upon recovering of the disc 15, both ends of the empty jacket 11 are fitted into the inner depressions 61c and 60c of the sliders 61 and 60, to insert the jacket 11 into the final position within the reproducing apparatus 50. At this point, the locking of the lid plate 12 is released, and the lid plate 12 engages with the jacket 11. In addition, the disc 15 is recovered and incased within the disc case 10, and the states of the disc case ejecting mechanism 100 and 100A become as shown in FIG. 4B. Accordingly, when the pushing force exerted against the jacket 11 to insert the disc case 10 is released after the jacket 11 is inserted into the reproducing apparatus 50, the disc case ejecting mechanisms 100 and 100A respectively operate in similar manners as described with respect to the above case, to push and move the disc case 10 by a predetermined amount. Thus, the gripping portion 25 of the disc case 10 projects from the inserting opening 62. Therefore, the operator can easily pull out the disc case 10 in the direction of the arrow X2, by holding the gripping portion 25 which projects from the inserting opening 62.

As described above, the disc case ejecting mechanisms 100 and 100A respectively operate upon loading of the disc and unloading of the disc, and thus, the disc case 10 need not be projecting from the inserting opening 62 upon final inserting operation of the disc case 10. Accordingly, the dimension of the disc case 10 in the inserting direction can be reduced. More particularly, the size of the disc case 10 can be reduced as shown in FIG. 1, in which the length along the inserting direction of the disc case can be reduced substantially equal to the diameter of the disc 15. Hence, the disc case 10 can be handled more easily, and can be manufactured at low cost.

Moreover, the push-back force which pushes the disc case 10 back, acts evenly on the sliders 60 and 61 provided on both sides, and thus, the push-back operation can be performed smoothly without urging the disc case towards one particular direction. In addition, this smooth push-back operation is finely performed, since the push-back members 101 and 101A do not push the jacket 11 directly, and respectively push the sliders 61 and 60.

The disc case ejecting mechanisms 100 and 100A do not require large spaces in which the mechanisms are to be provided, since the disc case ejecting mechanisms 100 and 100A are respectively assembled within the guide rails 59 and 58. Thus, the size of the disc case ejecting mechanisms can be reduced.

Furthermore, the push-back force to push back the jacket 11 in the direction of the inserting opening 62 does not act on the lid plate 12 as in the conventional apparatus, and hence, the disc holding mechanism 53 and the lid plate locking mechanism 54 need not be especially powerful. Moreover, the operation to spread the disc holding mechanism 53 by the insertion of the disc case 10 upon loading of the disc 15, can be performed by use of a relatively small force, and does not become a large load upon insertion of the disc case 10. Therefore, the insertion of the disc case 10 into the final position within the reproducing apparatus 50, can be performed by use of a small force.

Further, this invention is not limited to these embodiments but various variations and modifications may be made without departing from the scope of the invention.

What is claimed is:

1. Apparatus for reproducing information signals from a disc-shaped recording medium which was accommodated within a case, said case having a jacket including space for accommodating said disc-shaped recording medium therein, an opening through which said disc-shaped recording medium can enter and leave said jacket, and a lid member which is inserted through said opening of said jacket for covering and closing said opening, said reproducing apparatus comprising:

a panel defining an inserting opening through which said case is manually inserted;

holding means for holding at least one of said disc-shaped recording medium and said lid member, said holding means being located at an innermost part of said reproducing apparatus opposite said inserting opening with a turntable interposed between said holding means and said opening; and push-back means having energy storing members which are urged responsive to an inserting operation in which said case is inserted through said inserting opening and into the innermost part of said reproducing apparatus, said push-back means pushing back said case when the force pushing it during insertion stops acting on said case, said pushing back being responsive to the stored energy forces exerted by said energy storing members, to push back said case in a direction opposite to the direction of the insertion of said case so that a part of said case projects outwardly from said inserting opening;

said push-back means further having push-back members for acting on left and right side edges of a front surface of said jacket which faces toward the direction of the insertion of said case, left and right guide rails respectively positioned at left and right sides of said reproducing apparatus and extending along the direction of the insertion of said case, and left and right sliders freely movable on said guide rails, said sliders respectively supporting the left and right side edges of the front surface of said jacket which faces toward the direction of the insertion of said case and moving along said guide rails upon a loading and unloading of said disc-shaped recording medium, said energy storing members being spring members which undergo resilient deformation for applying force against said sliders in a direction opposite to the direction of the insertion of said case, upon insertion of said case into a final position within said reproducing apparatus.

2. A reproducing apparatus as claimed in claim 1 in which said guide rails respectively have groove portions extending in the longitudinal direction at the innermost part of said reproducing apparatus, and said spring member is a coil spring inserted and provided within said groove portion.

3. A reproducing apparatus as claimed in claim 1 in which said guide rails have grooves at the innermost part of said reproducing apparatus extending along the longitudinal direction, said push-back members being freely movable along said grooves of said guide rails into a state where portions of said push-back members which project are inserted into said grooves of said guide rails and said push-back members respectively engage said sliders, and said energy storing members are inserted into said grooves of said guide rails.

* * * * *